United States Patent
Wang et al.

(10) Patent No.: US 9,545,650 B2
(45) Date of Patent: Jan. 17, 2017

(54) METHOD FOR SORTING AND COMPREHENSIVELY UTILIZING MUNICIPAL SOLID WASTE

(71) Applicant: XI'AN JIAOTONG UNIVERSITY, Xi'an, Shaanxi (CN)

(72) Inventors: Shuzhong Wang, Shaanxi (CN); Lin Chen, Shaanxi (CN); Jun Zhao, Shaanxi (CN); Haiyu Meng, Shaanxi (CN); Longfei Wang, Shaanxi (CN); Xuedong Li, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 12 days.

(21) Appl. No.: 14/399,927

(22) PCT Filed: Dec. 6, 2012

(86) PCT No.: PCT/CN2012/086074
§ 371 (c)(1),
(2) Date: Nov. 7, 2014

(87) PCT Pub. No.: WO2013/166830
PCT Pub. Date: Nov. 14, 2013

(65) Prior Publication Data
US 2015/0135785 A1 May 21, 2015

(30) Foreign Application Priority Data
May 7, 2012 (CN) .......................... 2012 1 0138427

(51) Int. Cl.
*B07C 5/12* (2006.01)
*B09B 3/00* (2006.01)
(Continued)

(52) U.S. Cl.
CPC . *B09B 3/00* (2013.01); *B03B 7/00* (2013.01); *B03B 9/06* (2013.01); *B07B 1/14* (2013.01);
(Continued)

(58) Field of Classification Search
CPC .............. B07B 1/18; B07B 1/22; B02C 17/00; B02C 17/007; B02C 17/02; B03B 9/06; B03B 2009/068; C08L 23/06; C08L 23/12; C08L 27/06; C08L 97/02; C10L 15/46
(Continued)

(56) References Cited

U.S. PATENT DOCUMENTS

5,024,770 A * 6/1991 Boyd ........................ B03B 9/06
209/13
5,250,100 A * 10/1993 Armbristor ............... B03B 9/06
71/14
(Continued)

*Primary Examiner* — Joseph C Rodriguez
*Assistant Examiner* — Kalyanavenkateshware Kumar (57) ABSTRACT

A method for sorting and comprehensively utilizing municipal solid waste includes steps of: 1) feeding the municipal solid waste into a feeding tank through a feeding inlet, then outputting into a breaking device; 2) breaking refuse bags and large blocks by the breaking device; 3) transporting broken refuse into a two-stage roller screen for screening out dusts with a particle size of less than 3 mm, and hanging strips; and 4) transporting mixed refuse screened by the two-stage screen into a vibrating screen; screening oversize products by a heavy winnowing machine for separating inorganic blocks, large plastics and paper; transporting underflow products into a two-room multi-functional winnowing machine for dividing into heavy materials, light materials and medium materials. By effectively combining sorting devices, effective sorting and reutilization of mixed refuse are achieved. Thereafter, paper, fibers, plastics and kitchen organic refuse are respectively for producing refuse derived fuel, wood-plastic composite and fertilizer.

7 Claims, 8 Drawing Sheets

(51) Int. Cl.
| | |
|---|---|
| B07B 9/00 | (2006.01) |
| B09B 5/00 | (2006.01) |
| C10L 5/46 | (2006.01) |
| C08L 23/04 | (2006.01) |
| C08L 23/06 | (2006.01) |
| B07B 1/14 | (2006.01) |
| B03B 7/00 | (2006.01) |
| B03B 9/06 | (2006.01) |
| B07B 1/24 | (2006.01) |
| B29B 17/04 | (2006.01) |
| B29C 47/00 | (2006.01) |
| C05C 3/00 | (2006.01) |
| C05F 17/00 | (2006.01) |
| C05G 3/00 | (2006.01) |
| C10L 5/04 | (2006.01) |
| C10L 5/14 | (2006.01) |
| C10L 5/28 | (2006.01) |
| C10L 5/36 | (2006.01) |
| C10L 5/40 | (2006.01) |
| C08L 23/10 | (2006.01) |
| C10L 5/44 | (2006.01) |
| B29K 101/12 | (2006.01) |
| B29K 105/26 | (2006.01) |
| B29K 511/14 | (2006.01) |

(52) U.S. Cl.
CPC . *B07B 1/24* (2013.01); *B07B 9/00* (2013.01); *B09B 5/00* (2013.01); *B29B 17/0412* (2013.01); *B29C 47/0004* (2013.01); *B29C 47/0023* (2013.01); *C05C 3/005* (2013.01); *C05F 17/00* (2013.01); *C05G 3/0058* (2013.01); *C08L 23/04* (2013.01); *C08L 23/06* (2013.01); *C10L 5/04* (2013.01); *C10L 5/14* (2013.01); *C10L 5/28* (2013.01); *C10L 5/36* (2013.01); *C10L 5/40* (2013.01); *C10L 5/403* (2013.01); *C10L 5/46* (2013.01); *B29K 2101/12* (2013.01); *B29K 2105/26* (2013.01); *B29K 2511/14* (2013.01); *C08L 23/10* (2013.01); *C10L 5/442* (2013.01); *C10L 2200/0209* (2013.01); *C10L 2200/0469* (2013.01); *C10L 2250/06* (2013.01); *C10L 2290/08* (2013.01); *C10L 2290/24* (2013.01); *C10L 2290/30* (2013.01); *C10L 2290/32* (2013.01); *C10L 2290/40* (2013.01); *C10L 2290/546* (2013.01); *Y02E 50/10* (2013.01); *Y02E 50/30* (2013.01); *Y02E 50/343* (2013.01); *Y02P 20/145* (2015.11); *Y02W 30/43* (2015.05); *Y02W 30/47* (2015.05); *Y02W 30/521* (2015.05); *Y02W 30/523* (2015.05); *Y02W 30/78* (2015.05)

(58) Field of Classification Search
USPC ........ 209/293, 294, 284, 616, 627, 688, 930
See application file for complete search history.

(56) References Cited

U.S. PATENT DOCUMENTS

| | | | | |
|---|---|---|---|---|
| 6,464,082 | B1 * | 10/2002 | Kimmel | B07C 5/3427 209/11 |
| 7,273,150 | B2 * | 9/2007 | Fridman | B07B 1/005 198/313 |
| 7,497,337 | B2 * | 3/2009 | Tse | B02C 17/007 209/284 |
| 2003/0141225 | A1 * | 7/2003 | Liddle | B03B 5/28 209/18 |
| 2006/0004237 | A1 * | 1/2006 | Appel | A61L 11/00 585/241 |
| 2011/0121112 | A1 * | 5/2011 | Alford | A61L 11/00 241/15 |

* cited by examiner

METHOD FOR SORTING AND COMPREHENSIVELY UTILIZING MUNICIPAL SOLID WASTE

CROSS REFERENCE OF RELATED APPLICATION

This is a U.S. National Stage under 35 U.S.C. 371 of the International Application PCT/CN2012/086074, filed Dec. 6, 2012, which claims priority under 35 U.S.C. 119(a-d) to CN 201210138427.9, filed May. 07, 2012.

BACKGROUND OF THE PRESENT INVENTION

Field of Invention

The present invention relates to treatment of urban domestic refuse, and more particularly to a method for sorting and comprehensively utilizing municipal solid waste. Especially, different ingredients such as organic matter, magnetic substances, plastics and fabrics of the refuse are efficiently sorted by a mechanical method. Then different reutilization methods are applied according to different substances sorted, for achieving reduction, harmlessness, and reutilization of the refuse.

Description of Related Arts

With the rapid development of Chinese economy, the amount of urban domestic refuse generated rapidly growths. In 2010, Chinese urban domestic refuse disposed is amounted to 150 million tons, and over 80 acres of lands are occupied for landfill and storage of the refuse. ⅔ of large and medium-sized cities in China have been surrounded by refuse, and ¼ of the cities in China have no suitable place for refuse. Furthermore, it is difficult to find site for and construct new refuse dump. For example, in Xi'an, the average daily production of refuse is about 5,600 tons, and there is only one landfill site at Jiangcungou, which brings great risk to refuse treatment. A new landfill site has been planned for several years, but construction is not able to start because of social resistance. It is expected that in 2020, a total amount of urban domestic refuse disposed will up to 250 million tons. Waste disposal problem is imminent.

Conventionally, landfill, compost and incineration methods are mainly utilized for refuse disposal in China, and are not able to thoroughly achieve harmlessness and reutilization of domestic refuse.

First, the landfill method: The refuse disposed by the landfill method is more than 85% of a total amount of refuse in China. CH4-rich landfill gas is easy to be generated in the landfill site. As a result, explosion occurred in Guangdong, Yunnan, etc. Furthermore, the landfill site will generate a lot of refuse leachate, which comprises toxic organic chemical pollutants such as heavy metals, and a lot of pathogens as well as viruses, which may infiltrate to groundwater and cause serious groundwater pollution. The leachate of a refuse dump near the Hexi water source of Yongding River in Beijing was not handled properly, which results in safety risk of drinking water for 10 million people in the area.

Second, the incineration method: The refuse disposed by the incineration method is approximately 9% of the total amount of refuse in China. By incineration, thermal energy inside the refuse is efficiently used and a weight of the refuse is reduced by more than 75%. However, highly toxic carcinogen "dioxins" is easy to be generated during the refuse incineration, and fly ash generated by incineration comprises a large amount of heavy metals, which are hazardous refuse and improper treatment thereof will cause serious pollution. Furthermore, the heavy metals and dioxins are difficult to be online-monitored, and treatment thereof is expensive. As a result, environmental protection investment is more than ⅓ of a total investment of a refuse incineration generation station, and emissions standards are still difficult to achieve. Conventionally, in Guangzhou and other places, a number of refuse incineration generation stations have been forced outage among the public pressure. In developed countries such as United States and Japan, refuse incineration generation stations were continuously shut down since 2000.

Third, the compost method: The refuse disposed by the compost method is about 4% of the total amount of refuse in China. By the compost method, the refuse is reutilized. However, sorting during the compost method is not thorough, and plastic, iron, glass and other materials will be left in fertilizer raw materials. As a result, the fertilizer produced is not clean, products lose value as a fertilizer, soil is polluted, and crops are harmed. A reduction rate of the compost method is up to 70%, and more than 30% of residue thereof needs further disposal.

Conventionally, Chinese government and environmental health departments put more and more emphasis on sorting and comprehensively utilizing technology of refuse. The technology integrates refuse sorting and reutilization methods such as incineration, landfill and compost. Firstly, the refuse materials which are able to be reutilized are sorted corresponding to each reutilization methods, and the sorted materials are able to be utilized according to different reutilization methods.

According to analysis of refuse sorting and utilizing technology in China, conventional problems to be solved are as follows:

Firstly, sorting equipment and technology are not optimized corresponding to refuse characteristics in China. Conventionally, technology and equipment applied in China are mainly conventional sorting techniques in fields such as agriculture and mining, which is not optimized corresponding to complex components and high moisture content of the refuse. As a result, useful substances such as paper and plastic in refuse are not efficiently sorted and recycled.

Secondly, refuse sorting equipments are not mechanized, automatized, or systematized. Several comprehensive refuse treatment stations were closed, which proves that manual sorting or simple integration of a single device is not able to efficiently sort, and different sorting methods should be taken advantage of, for integrating different sorting equipments in one system.

Thirdly, no sorting method is designed for different characteristics of the urban domestic refuse. Composition of the urban domestic refuse is very complex, and domestic refuse of different cities is quite different. For different refuse composition, using the same refuse sorting equipment may cause low sorting efficiency and reduce the quality of investment. Furthermore, the equipments needing investment and construction are not strengthened, and non-essential equipments cause a refuse of money. Therefore, a success refuse sorting experience of one city is not necessarily appropriate for another city. A sorting system should be designed corresponding to domestic refuse characteristics of the city, and parameters of equipments of the system should be optimized. However, most design institutes and sorting equipment manufacturers have insufficient understanding of difficulty of refuse sorting in China, and study little about refuse composition variability and optimization of operating parameters of sorting equipment and systems, which worsen the operation of the domestic refuse sorting system built in China (the vast majority thereof have been completed in the outage state), the actual operation of the equipment are difficult to meet the design requirements.

Fourthly, recycling method of sorted product is not well researched, and the economic value of sorted product has not been fully reflected. The conventional sorting technology in China is not able to effectively combine the recycling technology and the sorting process. Overall economy of sorting, recycling and reusing is not high.

SUMMARY OF THE PRESENT INVENTION

An object of the present invention is to provide a method for sorting and comprehensively utilizing municipal solid waste, for sorting urban domestic refuse in a mechanized, fine and high-value form.

Accordingly, in order to accomplish the above object, the present invention provides:

A method for sorting and comprehensively utilizing municipal solid waste, comprising steps of:

1) feeding the municipal solid waste into a feeding tank through a feeding inlet, then outputting the municipal solid waste into a breaking device through a feeding outlet of the feeding tank;

2) breaking refuse bags and large blocks by the breaking device;

3) transporting broken refuse into a two-stage roller screen for screening, wherein dusts with a particle size of less than 3 mm are screened out, and strips are hung, the strips are fibers and strip-like plastics; then transporting the dusts into a settling pond; and separating the fibers from the plastics by heavy winnowing, wherein the fibers are for producing refuse derived fuel, and the plastics are for producing wood-plastic composite; and 4) transporting mixed refuse, formed by screening out the dusts and the strips by the two-stage screen, into a vibrating screen, wherein a hole diameter of a screen net of the vibrating screen is 10 mm, oversize products are large plastics and inorganic blocks with a particle size of over 10 mm; screening the oversize products by a heavy winnowing machine for separating the inorganic blocks, the large plastics and paper; transporting the inorganic blocks into a crushing device, then screening with the two-stage roller screen after crushing the inorganic blocks into a size of less than 3 mm; transporting underflow products with a particle size of no more than 10 mm into a two-room multi-functional winnowing machine for winnowing, and dividing the underflow products into heavy materials, light materials and medium materials by the two-room multi-functional winnowing machine; outputting the heavy materials, comprising metals, masonry, ceramics and glass, from the two-room multi-functional winnowing machine and separating magnetic materials by a magnetic separation device for recycling, and burying the masonry, the ceramics and the glass; mixing the light materials, comprising paper and plastics, with the large plastics and the paper screened out by the heavy winnowing machine, and separating the plastics and the paper by a vertical heavy winnowing machine, wherein the plastics are for producing the wood-plastic composite after cleaning, and the paper is for producing the refuse derived fuel; the medium materials comprises kitchen refuse for producing fertilizer.

Preferably, producing the fertilizer with the kitchen refuse comprises steps of: directly mixing the medium materials obtained by the two-room multi-functional winnowing machine with a material selected from a group consisting of chicken manure, pig manure, straw and rice husks, then transporting to an aerobic fermentation device to aerobically ferment for 10~15 days, fermenting for 30 days in a static windrow accumulation form, then separating out plastics and inorganic impurities with a particle size of more than 4~5 mm; then transporting to a fertilizer base tank, weighting, adding ammonia water and vapor, and transporting to a granulating device for granulating; after granulating, transporting to a drier for being dried, then placing on a dry leather belt for being further dried; then finely screening, and transporting underflow products with a particle size of less than 1 mm back to the fertilizer base tank; then coarsely screening, and transporting oversize products with a particle size of more than 5 mm back to the fertilizer base tank; then transporting to a cooler for being cooled before entering a final screen, and transporting underflow products with a particle size of less than 1 mm back to the fertilizer base tank; and packaging fertilizer end products.

Preferably, producing the wood-plastic composite with the plastics comprises steps of:

I) drying wood fiber powder, crushed to 40~80 meshes by a drying device, with a temperature of 150° C. for 3 h;

II) mixing the plastics obtained by heavy winnowing with the plastics obtained by the vertical heavy winnowing machine, cleaning and crushing, drying and dehydrating before granulating for obtaining mixed plastic grains with a size of 40~60 meshes; and III) firstly adding the wood fiber powder into a high-speed mixer of a heating device and stirring for 5 min, then adding the mixed plastic grains and additive agents except compatilizer and stirring, adding the compatillizer 5 min before outputting, and thoroughly stirring before outputting for obtaining the wood-plastic composite;

wherein components and contents of the wood-plastic composite are: polyethylene 30%~47%, polypropylene 5%~8%, polyvinyl chloride 10%~15%, the wood fiber powder 30%~35%, the compatibilizer 3%~8%, coupling agent 0.3%~2.4%, light stabilizer 0.3%~0.5%, antioxidant 0.3%~0.5%, lubricant 2%~4%, coloring agent 1%~3%, antistatic agent 0.2%~0.4%, and deodorizing bactericidal preservatives 0.2%~0.3%; the wood fiber powder is selected from a group consisting of poplar, peach, locust and cedar wood fiber powder; the compatibilizer is HD900E ester compatibilizer; the coupling agent is titanate JTW-130 coupling agent; the light stabilizer is bis(2,2,6,6-tetramethyl-4-piperidyl)sebacate; the antioxidant is 3-methyl-4-isopropyl-phenol; the lubricant is polyethylene wax; the coloring agent is quinacridone coloring agent; the antistatic agent is octadecyl dimethyl hydroxyethyl quaternary ammonium nitrate; and the deodorizing bactericidal preservatives is SW100 deodorant of YITERTM.

Preferably, producing the wood-plastic composite with the plastics further comprises steps of:

IV) granulating wood-plastic grain materials obtained by the high-speed mixer for obtaining wood-plastic grains; and V) squeezing and molding the wood-plastic grains by a screw extruder, and obtaining end products; wherein during squeezing and molding, a feeding section temperature is 140° C., and a squeezing section temperature is 210° C.

Preferably, producing the refuse derived fuel with the paper and the fibers comprises steps of:

a) mixing the paper with the fibers for forming a domestic refuse combustible component, then drying with a rotary drier with a drying temperature of 200° C. for reducing a moisture content to 25%;

b) crushing the domestic refuse combustible component with a cutting crusher, in such a manner that 95% of crushed grains have a size of less than 20 mm;

c) crushing bituminous coal into a particle size of 3~5 mm, then mixing with the domestic refuse combustible component and calcium oxide, thoroughly stirring and storing for 10 min;

d) adding a mixture of industrial corn starch and sodium humate;

e) squeezing and molding by a screw extrusion molding machine during a molding process; and f) drying the refuse derived fuel obtained by squeezing and molding with a drying temperature of 150° C. for reducing a moisture content thereof to 12%;

wherein components and contents of the refuse derived fuel are: the domestic refuse combustible component 65.0%~74.0%, the bituminous coal 21.5%~30%, the calcium oxide 1.0%~2.5%, the industrial corn starch 1.5%~2.5%, and the sodium humate 1.0%.

Preferably, the step 3) further comprises steps of: after transporting the dusts into the settling pond, separating organic substances and inorganic substances by settling, preparing methane with the organic substances, and burying the inorganic substances.

Preferably, the two-stage roller screen comprises a supporter, a roller screen and a roller screen driver both mounted on the supporter; wherein the roller screen comprises a roller screen inlet section and a roller screen outlet section connected to each other; an inlet is mounted at an entrance of the roller screen inlet section, and an underflow product collector is provided under the roller screen; the roller screen inlet section and the roller screen outlet section respectively have a plurality of screening holes, a plurality of bag-breaking knives are mounted on a circumference internal surface of the roller screen inlet section, and a knife cleaner corresponding to the bag-breaking knife are provided in the roller screen inlet section; a hole cleaner is mounted on circumference external surfaces of the roller screen inlet section and the roller screen outlet section for cleaning the screening holes; a plurality of strip hangers are mounted on a circumference internal surface of the roller screen outlet section, a strip collector, comprising three rows of hook needle chains, is mounted in the roller screen outlet section.

Preferably, an angle between the roller screen and a horizontal direction is 3°~8°.

Preferably, a shape of the bag-breaking knife is a rectangular pyramid, and a side surface is vertical to a bottom surface thereof.

Preferably, the bag-breaking knife is welded on a steel plate, and the steel plate is mounted on the circumference internal surface of the roller screen outlet section in an embedded form.

Preferably, the knife cleaner is fixed on a disc, and a rotation direction of the knife cleaner is opposite to a rotation direction of the bag-breaking knife.

Preferably, the three rows of the hook needle chains comprise a first hook needle chain, a second hook needle chain and a third hook needle chain. A plurality of hook needles are respectively provided on the first hook needle chain, the second hook needle chain and the third hook needle chain. A distance between the first hook needle chain and the second hook needle chain is 0.1 D, and a distance between the second hook needle chain and the third hook needle chain is 0.12 D. The first needle chain and the second needle chain are placed at a side of a center of the roller screen, and the third needle chain is placed at the other side of the center of the roller screen. A distance between the third needle chain and the center of the roller screen is 0.07 D, and a length thereof is 0.25 D, wherein D is a diameter of the roller screen.

Preferably, the two-room multi-functional winnowing machine comprises: a shell, a first winnowing room provided in the shell, a second winnowing room provided in the shell, and a winnowing vibrating screen provided in the shell; wherein a rotary feeder is mounted at an inlet of the shell; a first winnowing room inlet communicating with a blower set is provided under the rotary feeder; a first two-level gas-sealing outputting device is provided under the first winnowing room and near the first winnowing room inlet; the winnowing vibrating screen is provided on right of the first two-level gas-sealing outputting device; a second two-level gas-sealing outputting device is provided under the winnowing vibrating screen; the second winnowing room is provided on right of the winnowing vibrating screen; a second winnowing room inlet communicating with the blower set is provided under an outlet of the winnowing vibrating screen, a third two-level gas-sealing outputting device is provided under the second winnowing room and near the second winnowing room inlet, and a fourth two-level gas-sealing outputting device is provided under the second winnowing room and away from the second winnowing room inlet; a second comb plate is provided on the fourth two-level gas-sealing outputting device behind the second winnowing room; a first comb plate and a fifth two-level gas-sealing outputting device are provided behind the first winnowing room and away from the first winnowing room inlet; outlets of the first and second winnowing rooms are connected to a cyclone separator through pipes; and the cyclone separator is connected to the blower set through pipes.

Preferably, the rotary feeder comprises a rotary feeding gas-sealing device, and a separating roller provided under the rotary feeding gas-sealing device.

Preferably, cross sections of the first winnowing room inlet and the second winnowing room inlet along a gas inletting direction are right trapezoids, and cross sections of the first winnowing room inlet and the second winnowing room inlet vertical to the gas inletting direction are rectangles. A height of the right trapezoid equals to a short side vertical thereto, and an angle between a non-right side and the height is 10°~20°.

Preferably, transporters are respectively provided under the first two-level gas-sealing outputting device, the second two-level gas-sealing outputting device, the third two-level gas-sealing outputting device, the fourth two-level gas-sealing outputting device and the fifth two-level gas-sealing outputting device.

Preferably, the winnowing vibrating screen comprises a front section and a rear section, wherein the front section has square or round holes, and the second section is a vibrating plate utilized as a feeding device of the second winnowing room.

Preferably, the first comb plate and the second comb plate respectively have a longitudinal hollow slot. The two-room multi-functional winnowing machine for winnowing the urban domestic refuse further comprises a first scraper and a second scraper respectively engaged with the first comb plate and the second comb plate.

The present invention has advantages as follows:

Firstly, corresponding to high moisture content and complex components of the refuse in China, structures of refuse breaking, sorting and comprehensively utilizing devices are improved.

Secondly, with advantages of different sorting methods, different sorting devices are effectively combined. No manual sorting is needed and a whole process is mechanized.

Thirdly, according to the present invention, resource utilization is maximized. Producing organic fertilizer with organic substances, producing refuse derived fuel with combustible substances and producing wood-plastic composite with plastics are effectively combined. Furthermore, the magnetic materials magnetically separated may be transported to steel recycling companies for directly recycling. Diversified resource utilization methods are able to effectively take advantages of refuse economic values.

DETAILED DESCRIPTION OF THE PREFERRED EMBODIMENT

Figure 1:
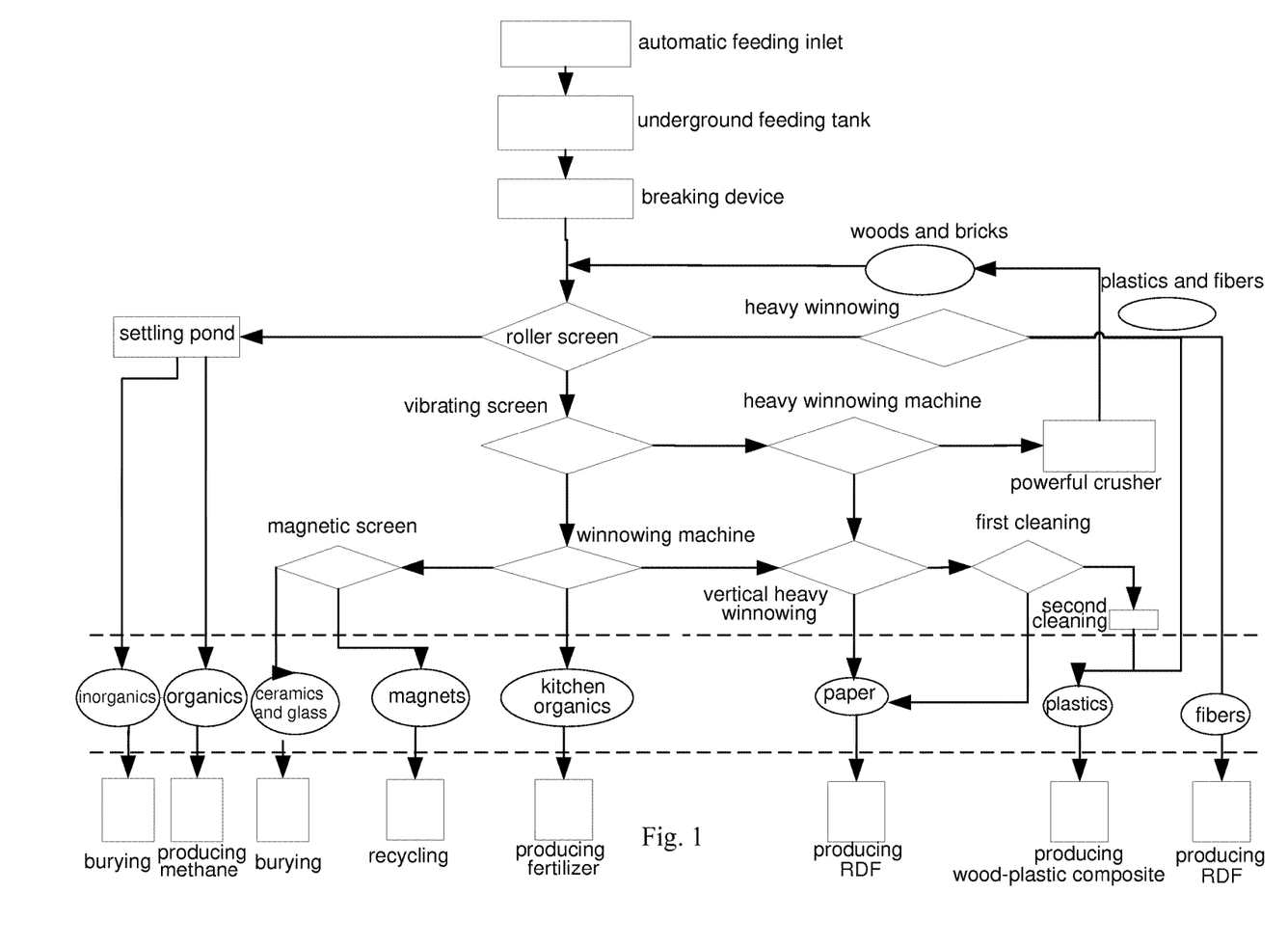
FIG. 1 is a flow chart of a method for sorting and comprehensively utilizing municipal solid waste according to a preferred embodiment of the present invention.

Referring to the drawings, the present invention is further illustrated. Referring to FIG. 1, a method for sorting and comprehensively utilizing municipal solid waste, comprising steps of: transporting urban domestic refuse to a comprehensive refuse treatment site by a municipal transportation vehicle, feeding the refuse into a feeding tank through a feeding inlet, wherein the feeding tank collects refuse leachate and has an automatic outputting function; then outputting the municipal solid waste into a breaking device through an automatic feeding outlet of the feeding tank;

breaking refuse bags and large blocks by the breaking device; transporting broken refuse into a two-stage roller screen for screening, wherein dusts with a particle size of less than 3 mm are screened out, and strips are hung, the strips comprise fibers and strip-like plastics; then separating the fibers from the plastics by heavy winnowing, wherein the fibers are for producing refuse derived fuel (RDF for short), and the plastics are for producing wood-plastic composite; transporting the dusts into a settling pond, burying inorganic substances steeled, and preparing methane with organic substances settled; and transporting mixed refuse, formed by screening out the dusts and the strips by the two-stage screen, into a vibrating screen, wherein a hole diameter of a screen net of the vibrating screen is 10 mm, oversize products are large plastics and inorganic blocks with a particle size of over 10 mm; screening the oversize products by a heavy winnowing machine for separating the inorganic blocks, the large plastics and paper; transporting the inorganic blocks into a powerful crushing device, then screening with the two-stage roller screen after crushing the inorganic blocks into a size less of than 3 mm; separating the plastics and the paper by a vertical heavy winnowing machine, transporting underflow products with a particle size of no more than 10 mm into a two-room multi-functional winnowing machine for winnowing, and dividing the underflow products into heavy materials, light materials and medium materials by the two-room multi-functional winnowing machine; outputting the heavy materials, comprising metals, masonry, ceramics and glass, from the two-room multi-functional winnowing machine and separating magnetic materials by a magnetic separation device for recycling, and burying inorganic substances such as the ceramics and the glass; mixing the light materials, comprising paper and plastics, with the large plastics and the paper screened out by the heavy winnowing machine, and separating the plastics and the paper by a vertical heavy winnowing machine, wherein the plastics are for producing the wood-plastic composite after first cleaning and second cleaning, and the paper is for producing the refuse derived fuel; the medium materials comprises kitchen refuse for producing fertilizer.

Figure 2:
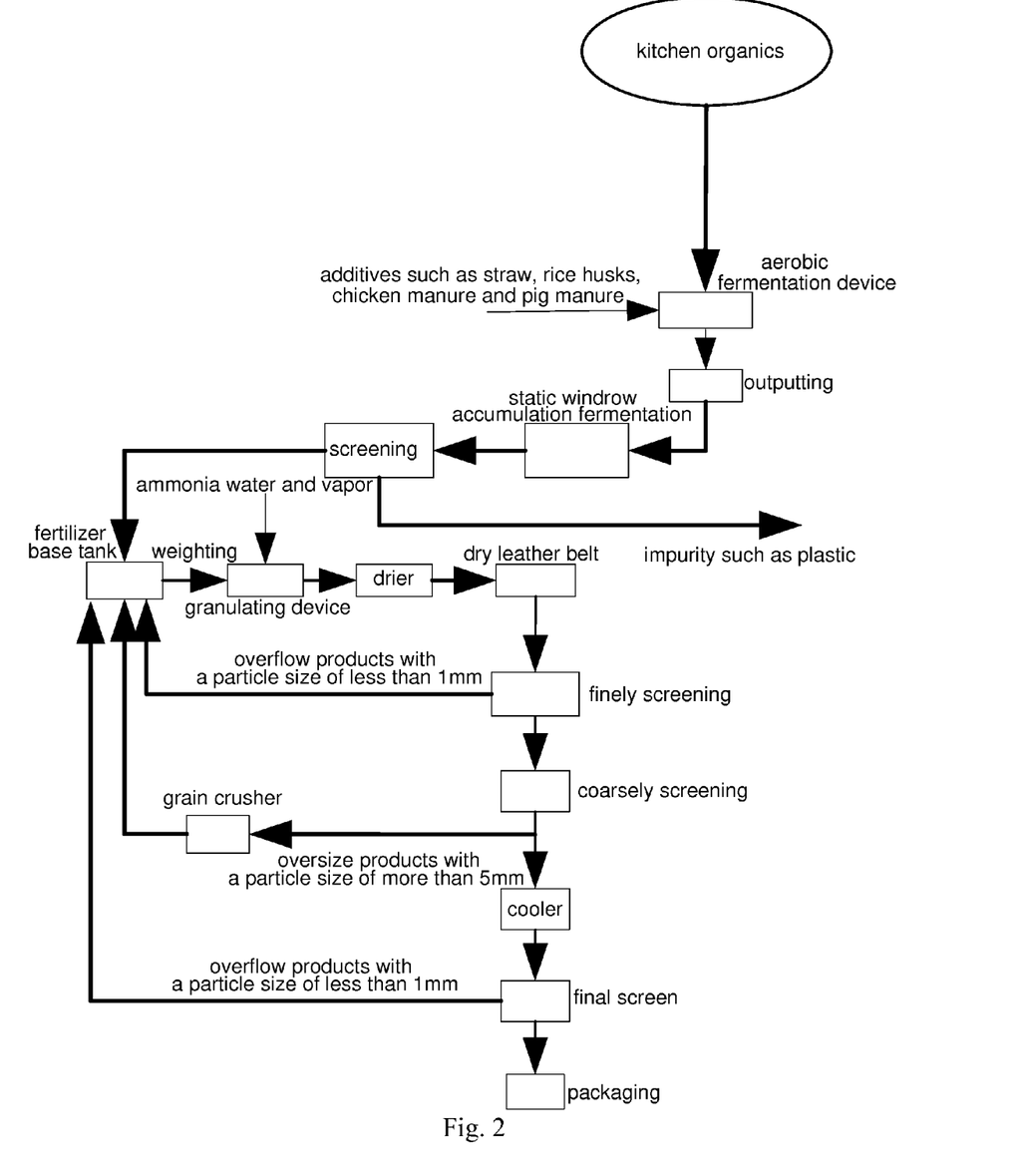
FIG. 2 is a flow chart of producing organic fertilizer with organic substances sorted from the refuse according to the preferred embodiment of the present invention.

Referring to FIG. 2, producing the fertilizer with the kitchen refuse comprises steps of: directly mixing the kitchen refuse obtained by the two-room multi-functional winnowing machine with a material selected from a group consisting of chicken manure, pig manure, straw and rice husks, then transporting to an aerobic fermentation device to aerobically ferment for 10~15 days, fermenting for 30 days in a static windrow accumulation form, wherein the kitchen refuse is fully fermented and is turned to puce; then separating out plastics and inorganic impurities with a particle size of more than 4~5 mm; then transporting to a fertilizer base tank, weighting, adding ammonia water and vapor, and transporting to a granulating device for granulating; after granulating, transporting to a drier for being dried, then placing on a dry leather belt for being further dried; then finely screening, and transporting underflow products with a particle size of less than 1 mm back to the fertilizer base tank; then coarsely screening, and transporting oversize products with a particle size of more than 5 mm back to the fertilizer base tank; then transporting to a cooler for being cooled before entering a final screen, and transporting underflow products with a particle size of less than 1 mm back to the fertilizer base tank; and packaging fertilizer end products.

Figure 3:
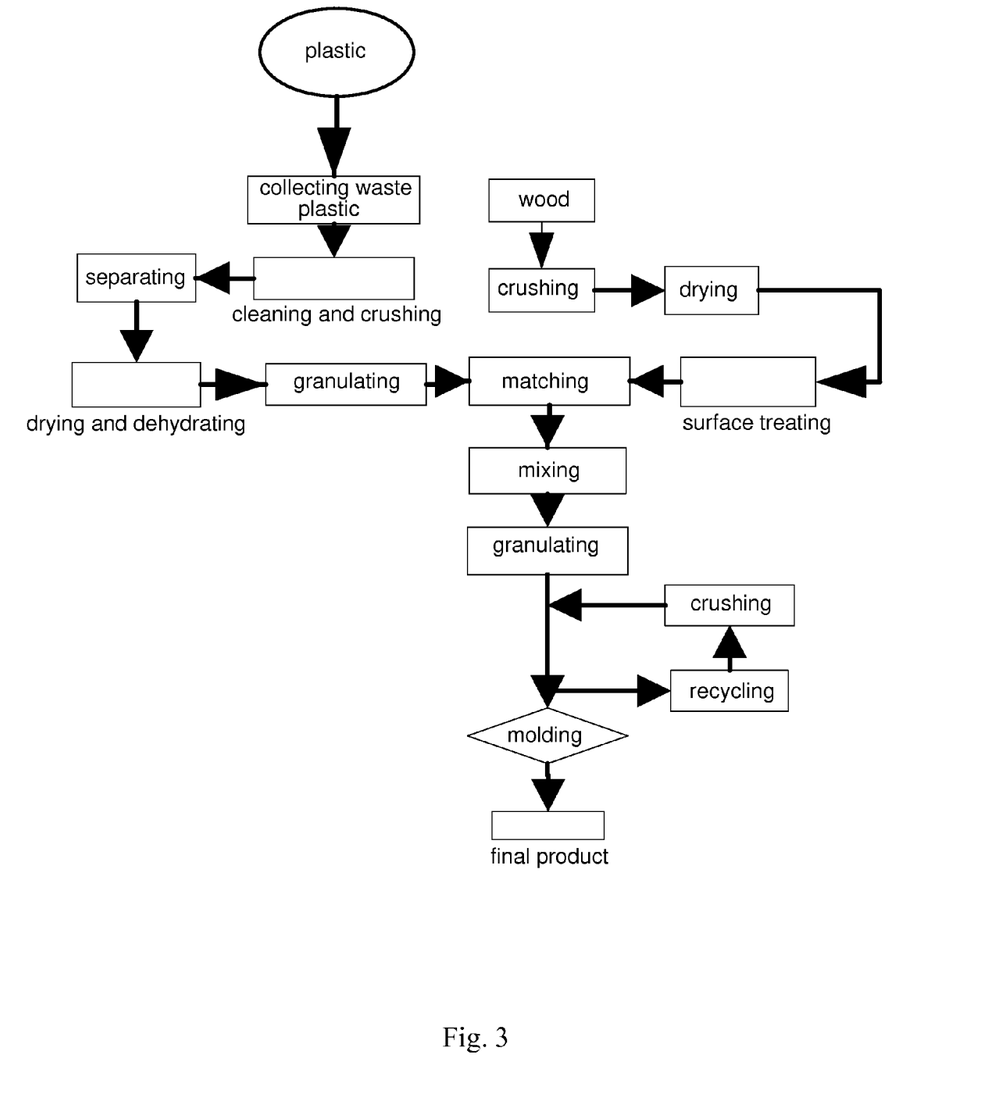
FIG. 3 is a flow chart of producing refuse derived fuel with combustible substances sorted from the refuse according to the preferred embodiment of the present invention.

Referring to FIG. 3, producing the wood-plastic composite with the mixed plastics sorted comprises steps of:

I) drying wood fiber powder, crushed to 40~80 meshes by a drying device, with a temperature of 150° C. for 3 h, for fully dehumidifying and removing low molecular volatile substances;

II) cleaning and crushing the plastics obtained, drying and dehydrating before granulating for obtaining mixed plastic grains with a size of 40~60 meshes;

III) firstly adding the wood fiber powder into a high-speed mixer of a heating device and stirring for 5 min, then adding the mixed plastic grains and additive agents except compatilizer and stirring, adding the compatillizer 5 min before outputting, and thoroughly stirring before outputting for obtaining the wood-plastic composite, wherein a total mixing time after adding the mixed plastic grains and the additive agents are 20~30 min; because of a semi-melted state after being heated in the mixer, the plastic is fully mixed with other materials with a stirring rotor and is adheres by the materials, and finally a grain is formed by the wood powder evenly wrapping the plastic;

IV) granulating wood-plastic grain materials obtained by the high-speed mixer for obtaining wood-plastic grains;

V) squeezing and molding the wood-plastic grains by a screw extruder, and obtaining end products; wherein during squeezing and molding, a feeding section temperature is 140° C., and a squeezing section temperature is 210° C.;

VI) testing samples with performance exams such as notched impact strength, cantilever impact strength, tensile strength, flexural strength, broken elongation, water absorption, screw gripping strength and Shore hardness, wherein a testing standard is GB17657-1999; and VII) cutting according to requirements, and installing according to a wood-plastic installing method, for forming different structures;

wherein components and contents of the wood-plastic composite are: the waste plastics, the wood fiber powder 30%~35%, and the additive agents; the wood fiber powder is selected from a group consisting of poplar, peach, locust and cedar wood fiber powder; the compatibilizer is HD900E ester compatibilizer; the coupling agent is titanate JTW-130 coupling agent; the light stabilizer is bis(2,2,6,6-tetramethyl-4-piperidyl)sebacate; the antioxidant is 3-methyl-4-isopropyl-phenol; the lubricant is polyethylene wax; the coloring agent is quinacridone coloring agent; the antistatic agent is octadecyl dimethyl hydroxyethyl quaternary ammonium nitrate; and the deodorizing bactericidal preservatives is SW100 deodorant of YITERTM.

Figure 4:
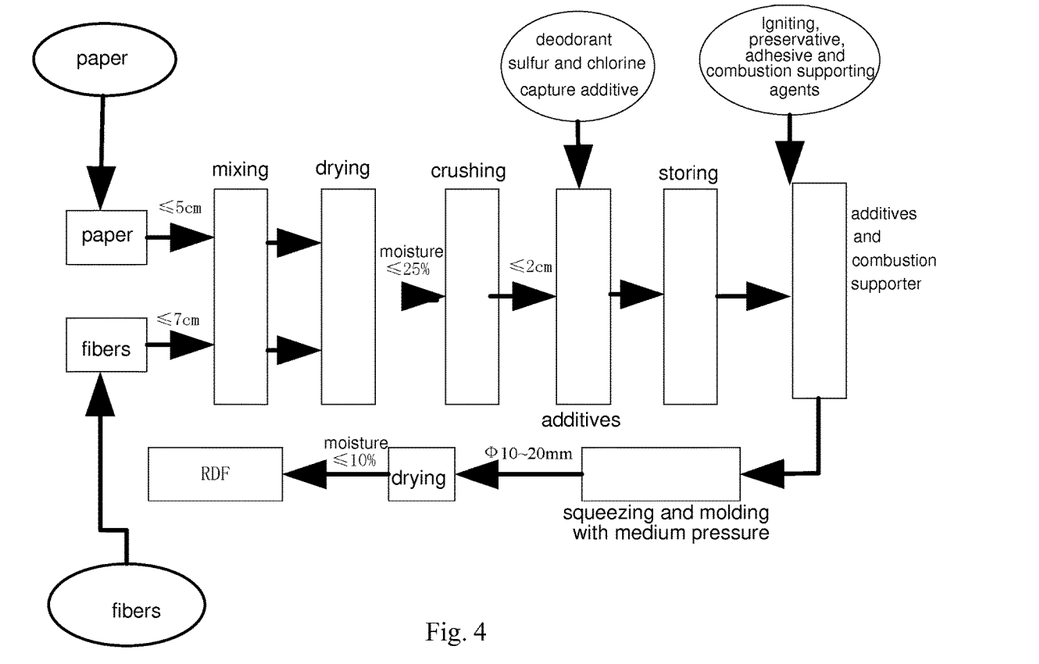
FIG. 4 is a flow chart of producing wood-plastic composite with plastics sorted from the refuse according to the preferred embodiment of the present invention.
Figure 5:
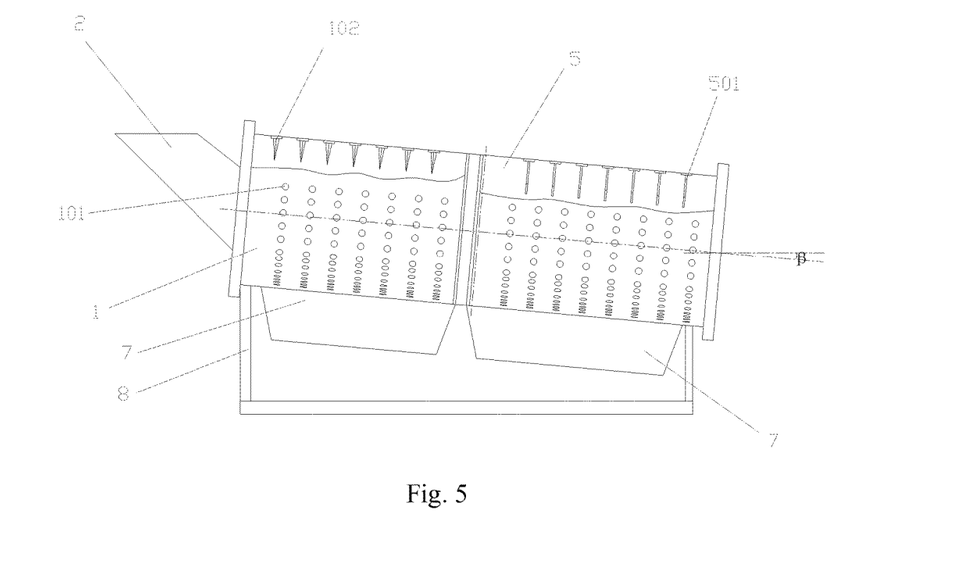
FIG. 5 is a sketch view of a two-stage roller screen according to the preferred embodiment of the present invention.
Figure 6:
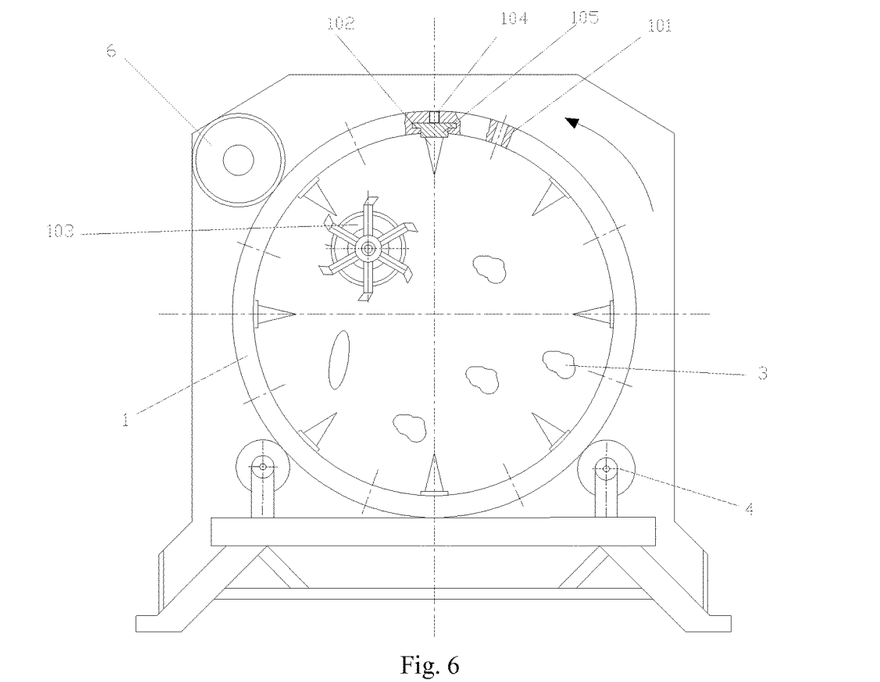
FIG. 6 is a sketch view of a roller screen inlet section of the two-stage roller screen according to the preferred embodiment of the present invention.
Figure 7:
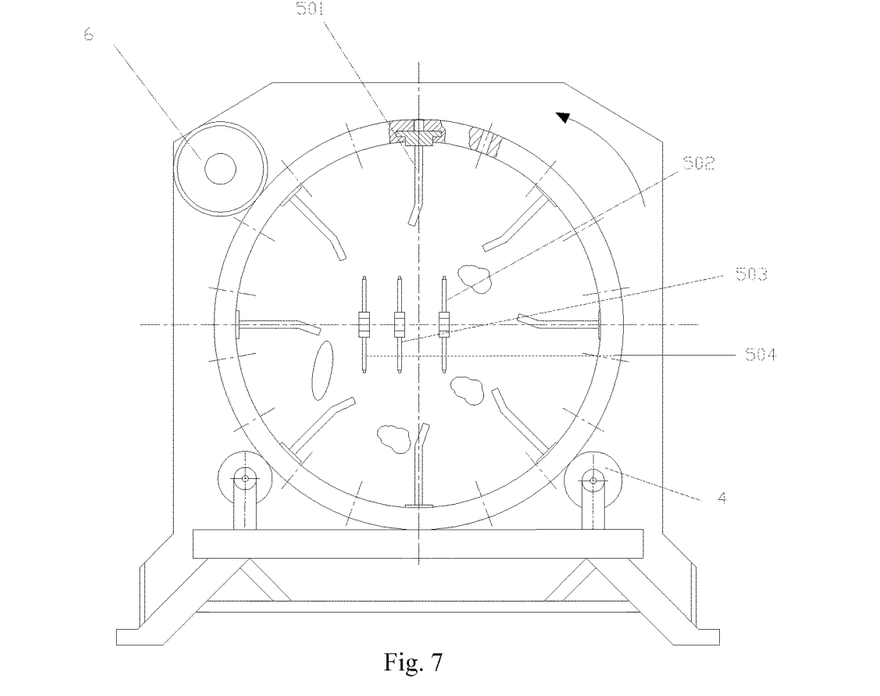
FIG. 7 is an axially sectional view of a roller screen inlet section of the two-stage roller screen according to the preferred embodiment of the present invention.
Figure 8:
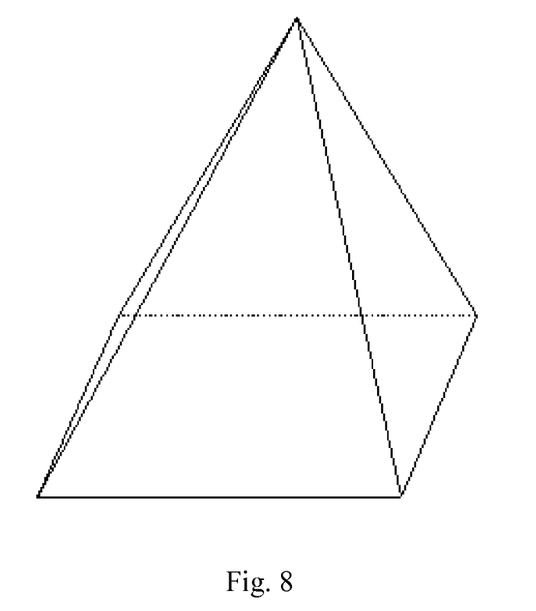
FIG. 8 is a sketch view of a bag-breaking knife of the two-stage roller screen according to the preferred embodiment of the present invention.
Figure 9:
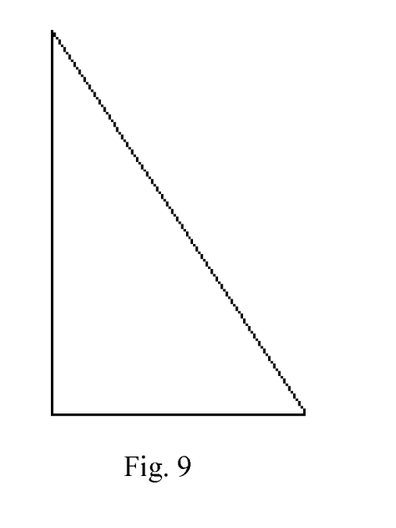
FIG. 9 is a left view of FIG. 8.
Figure 10:
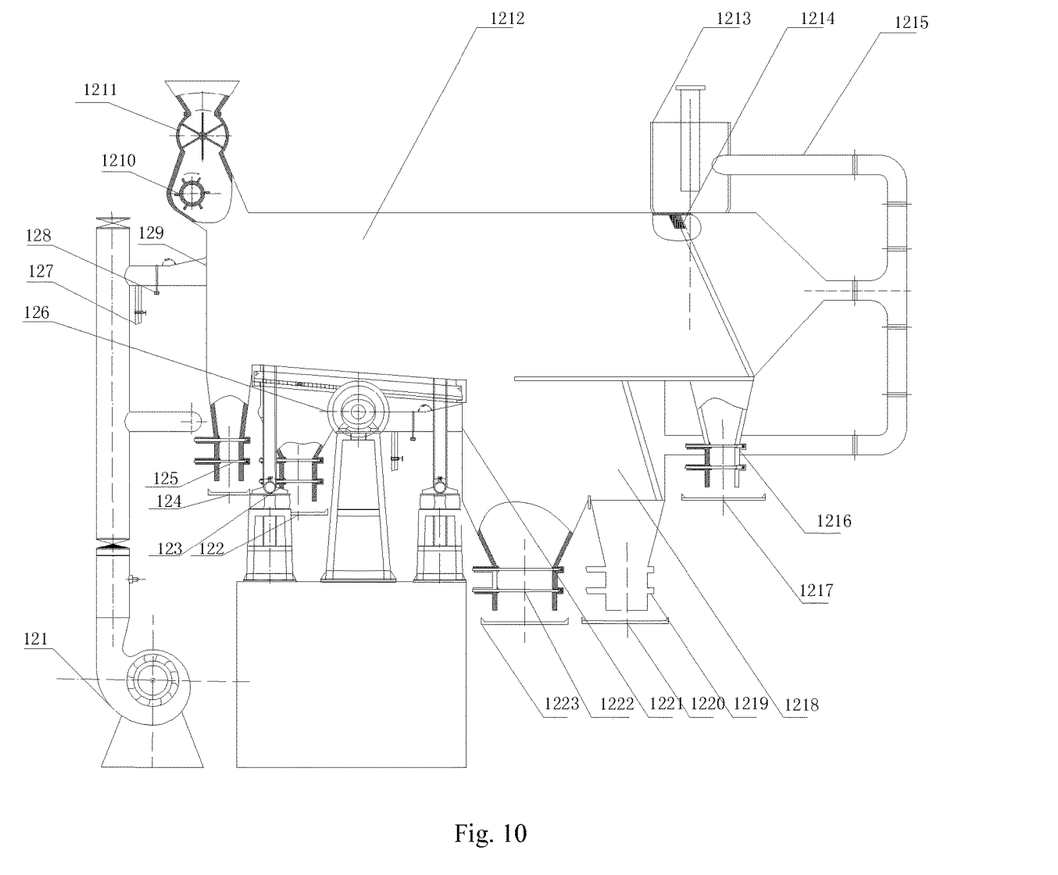
FIG. 10 is a sketch view of a two-room multi-functional winnowing machine for winnowing urban domestic refuse according to the preferred embodiment of the present invention.
Figure 11:
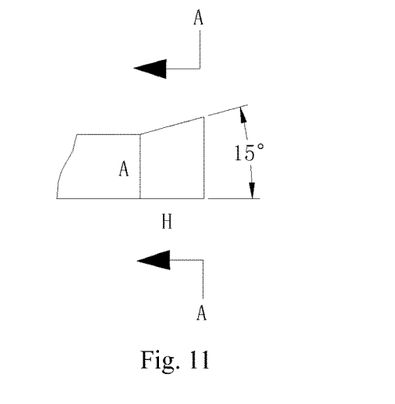
FIG. 11 is a sectional view of a winnowing room inlet along a gas inletting direction according to the preferred embodiment of the present invention.
Figure 12:
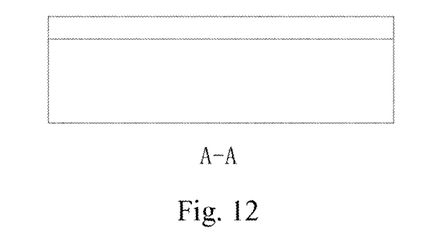
FIG. 12 is an A-A sectional view of FIG. 11.
Figure 13:
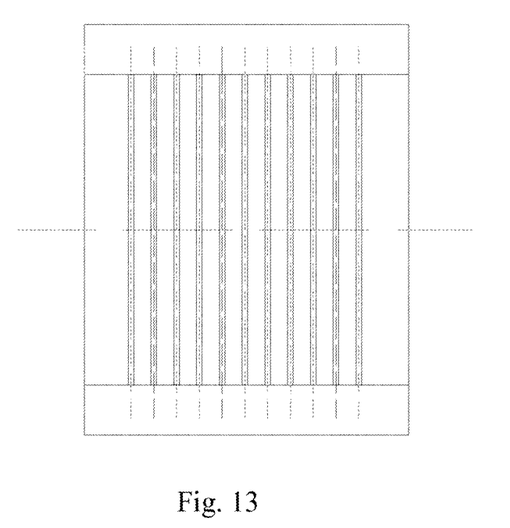
FIG. 13 is a sketch view of a comb plate according to the preferred embodiment of the present invention.

Referring to FIG. 4, producing the refuse derived fuel with the paper and the fibers comprises steps of:

a) mixing the paper with the fibers for forming a domestic refuse combustible component, then drying with a rotary drier with a drying temperature of 200° C. for reducing a moisture content to 25%;

b) crushing the domestic refuse combustible component with a cutting crusher, in such a manner that 95% of crushed grains have a size of less than 20 mm;

c) crushing bituminous coal into a particle size of 35 mm, then mixing with the domestic refuse combustible component and calcium oxide, thoroughly stirring and storing for 10 min;

d) adding a mixture of industrial corn starch and sodium humate;

e) squeezing and molding by a screw extrusion molding machine during a molding process, in such a manner that a 15 mm×25 mm column is formed;

f) drying the refuse derived fuel with a drying temperature of 150° C. for reducing a moisture content thereof to 12%, for producing the refuse derived fuel based on the domestic refuse combustible component; and g) naturally cooling to a room temperature, packaging before directly selling or sending to a storage;

wherein components and contents of the refuse derived fuel are: the domestic refuse combustible component 65.0%~74.0%, the bituminous coal 21.5%~30%, the calcium oxide 1.0%~2.5%, and an adhesion agent 2.5%~3.5%; the domestic refuse combustible component is waste paper and waster fibers in the domestic refuse; the adhesion agent is a mixture of industrial corn starch and sodium humate, wherein contents of the industrial corn starch and the sodium humate are: the industrial corn starch 1.5%~2.5%, and the sodium humate 1.0%.

Referring to FIGS. 5-9, the two-stage roller screen comprises a supporter 8, a roller screen and a roller screen driver 4 both mounted on the supporter 8; wherein the roller screen comprises a roller screen inlet section 1 and a roller screen outlet section 5 connected to each other; an inlet 2 is mounted at an entrance of the roller screen inlet section 1, and an underflow product collector 7 is provided under the roller screen; the roller screen inlet section 1 and the roller screen outlet section 5 respectively have a plurality of screening holes 101, a plurality of bag-breaking knives 102 are mounted on a circumference internal surface of the roller screen inlet section 1, and a knife cleaner 103 corresponding to the bag-breaking knives 102 is provided in the roller screen inlet section 1; a hole cleaner 6 is mounted on circumference external surfaces of the roller screen inlet section 1 and the roller screen outlet section 5 for cleaning the screening holes 101; a plurality of strip hangers are mounted on a circumference internal surface of the roller screen outlet section 5, a strip collector, comprising three rows of hook needle chains 502, 503 and 504, is mounted in the roller screen outlet section 5, an angle β between the roller screen and a horizontal direction is 3°~8°; the bag-breaking knife 102 is welded on a steel plate 105, and the steel plate 105 is mounted on the circumference internal surface of the roller screen outlet section 1 in an embedded form; for detaching the bag-breaking knife 102, the steel plate 105, where the bag-breaking knife 102 is welded, is pushed up by a screw rod through a screw hole 104, and the steel plate 105 is pulled out from the other side for being detached.

The domestic refuse is transported to a front section of the two-stage roller screen by a material transporter, and rotates with the two-stage roller screen. When rotates to a certain height, the domestic refuse is thrown in a parabolic form and backs to a bottom. By repeating the process, the domestic refuse continuously rolls in a roller of the two-stage roller screen. During rolling, the dust with a particle size of less than 3 mm drops to the underflow product collector through the screening holes, and materials with a particle size of more than 3 mm move along a roller surface and are outputted from a bottom outlet of the roller, for screening. When the domestic refuse is thrown and backs to the bottom, the bag-cutting knife at the front section of the two-stage roller screen pierces into materials such as plastic bags and clothes, and breaks the plastic bags and the clothes with squeezing and tearing functions of other materials, for breaking the plastic bags and the clothes. After being broken, the plastic bags and the clothes rotate with the roller and enter a rear section of the two-stage roller screen. The strip hanger is mounted along a circumference surface direction of the rear section, and the strip collector is mounted near a center thereof. During rotating after being broken, the plastic bags and the clothes are hung by the strip hanger, and drop to the strip collector for being outputted after reaching a certain height, in such a manner that the bags are broken and the strips are collected. For preventing the screening hole from blockage by the domestic refuse with a high moisture content, the hole cleaner is mounted on an external surface of the roller. The hole cleaner cooperates with the screen hole, wherein when the screen hole rotates to the hole cleaner, the hole cleaner cleans the screen hole for archiving a hole cleaning function.

Operation processes of the two-stage roller screen according to the present invention are as follows. Firstly, the domestic refuse is transported to the roller screen inlet section 1 of the two-stage roller screen through the inlet 2, and rotates with the two-stage roller screen. When rotates to a certain height, the domestic refuse is thrown in a parabolic form and backs to a bottom. By repeating the process, the domestic refuse continuously rolls in a roller of the two-stage roller screen. During rolling, the dust with a particle size of less than 3 mm drops to the underflow product collector 7 through the screening holes 101, and is transported to the settling pond. Materials with a particle size of more than 3 mm are outputted from the roller screen outlet section 5 and into the vibrating screen, for screening different materials. When the domestic refuse is thrown and backs to the bottom, the bag-cutting knife 102 at the circumference internal surface of the roller screen inlet section 1 pierces into materials such as plastic bags and clothes, and breaks the plastic bags and the clothes with squeezing and tearing functions of other materials, for breaking the plastic bags and the clothes. A shape of the bag-breaking knife 102 is a rectangular pyramid, and a side surface is vertical to a bottom surface thereof. After being broken, the plastic bags and the clothes rotate with the roller and enter the roller screen outlet section 5. The strip hanger 501 is mounted along a circumference internal surface direction of the roller screen outlet section 5, and the strip collector, comprising the hook needle chains 502, 503 and 504, is mounted in the roller screen outlet section 5. The hook needle comprises a movable part and a fixed part, wherein a plurality of hook needles are mounted on the movable part, the fixed part guilds a direction of the movable part, and the hook needles moves out of the roller screen outlet section 5 with the strips. During rotating after being broken, the plastic bags and the clothes are hung by the strip hanger 501, and drop to the strip collector after reaching a certain height. Because the strip collector is the hook needles with a limited width, only soft strips are hung on the strip collector. The plastics hung on the strip collector are transported out of the roller, in such a manner that the strips are collected and transported. For preventing the bag-breaking knife 102 from being winded by the plastics during bag breaking, the knife cleaner is mounted on an internal surface of the roller. The knife cleaner 103 is a disk with slickers. On the knife cleaner, two slickers cooperate with one of the bag-breaking knifes 102 and are respectively placed as two sides of the bag-breaking knife 102, wherein a rotation direction of the slicker is opposite to a rotation direction of the bag-breaking knife 102. When the bag-breaking knife 102 rotates to the slicker of the knife cleaner 103, the slicker at the two sides of the bag-breaking knife 102 cleans the plastics winded on the bag-breaking knife 102 for archiving a knife cleaning function. For preventing the screening hole 101 from blockage by the domestic refuse with a high moisture content, the hole cleaner 6 is mounted on an external surface of the roller. The hole cleaner 6 cooperates with the screen hole 101, wherein when the screen hole 101 rotates to the hole cleaner 6, the hole cleaner 6 cleans the screen hole 101 for archiving a hole cleaning function. The hole cleaner 6 may be a hairbrush hole cleaner.

Referring to FIGS. 10-13, according to the present invention, the two-room multi-functional winnowing machine is utilized. The urban domestic refuse enters a rotary feeding gas-sealing device 1211. Rotary fans of the rotary feeding gas-sealing device 1211 seals and cooperates with a shell of the two-room multi-functional winnowing machine, for preventing gas leakage from the rotary feeding gas-sealing device 1211. With rotation of the rotary fans of the rotary feeding gas-sealing device 1211, the urban domestic refuse evenly drops to a separating roller 1210 for being broken. Then the urban domestic refuse enters a first winnowing room 1212. A blower set 121 is connected to a first winnowing room inlet 129 at a top of the first winnowing room 1212 through a pipe. The urban domestic refuse is separated by wind from the blower set 121 for first sorting, wherein paper, plastics and heavy materials are sorted. The heavy materials comprises metals, masonry, ceramics, glass and large inorganic blocks, where are heavy and are not blown away. The heavy materials directly drop into a first two-level gas-sealing outputting device 125 (which is a heavy material outputting device) provided under an inlet of the first winnowing room 1212, and then are outputted by a heavy material transporter 124 for magnetically screening. Small inorganic blocks are blown and drop to a winnowing vibrating screen 126 right to the first two-level gas-sealing outputting device 125. The small inorganic blocks are screened by the winnowing vibrating screen 126 and drop to a second two-level gas-sealing outputting device 123 (which is a small inorganic block outputting device), and then transported by a small inorganic block transporter 122. Rest materials enter the second winnowing room 1218 and kitchen organic refuse is separated by eliminating impurities. A cyclone dust wiper 1213 communicates with outlets of the first winnowing room 1212 and the second winnowing room 1218. The wind processed with the cyclone dust wiper 1213 is sent to the blower set 121 for recycling. The heavy material transporter 124, the small inorganic block transporter 122, a kitchen refuse transporter 1223, a plastic and paper transporter 1220 and a plastic and paper transporter 1217 are provided at a bottom of the two-room multi-functional winnowing machine in sequence. Cross sections of the first winnowing room inlet 129 and the second winnowing room inlet 1221 along a gas inletting direction are right trapezoids, and cross sections of the first winnowing room inlet 129 and the second winnowing room inlet 1221 vertical to the gas inletting direction are rectangles. A height H (which is a longitudinal side) of the right trapezoid equals to a short side A vertical thereto, and an angle between a non-right side and the longitudinal side is 10°~20°, preferably, 15°. According to experiments and data simulation, when the cross sections of the first winnowing room inlet 129 and the second winnowing room inlet 1221 are the right trapezoids, flow distribution at the outlet is stable without vortex. A blowing speed of the first winnowing room inlet 129 is controllable by adjusting an outlet valve 127 and a flow meter 128.

With the foregoing structure, operation principles and embodiment are as follows. The refuse after being coarsely separated and crushed enters the first winnowing room 1212 through the rotary feeding gas-sealing device 1211. By adjusting a rotation speed of the rotary feeding gas-sealing device 1211, an inlet amount is effectively controlled. At the same time, utilizing the rotary feeding gas-sealing device 1211 is able to avoid gas leakage, maintain a micro-positive pressure in the winnowing machine, and stabilize flow distribution in the winnowing machine. The refuse inputted is separated by the separating roller 1210 for preventing winding and improving winnowing accuracy. After being separated by the separating roller 1210, the refuse enters the flow distribution of the winnowing room. Different materials longitudinally move with the wind, wherein heavy large inorganic blocks move little and drop to the first two-level gas-sealing outputting device 125. After being outputted, the heavy materials may be transported to a magnetic screen room for sorting metal materials. At the same time, in the first winnowing room 1212, the plastics and paper, which have a small density and are almost flat, are blown to an end of the winnowing room. One part thereof drops to a fifth two-level gas-sealing outputting device 1216 and then drops to a transporter 17 for being outputted. The other part thereof is scraped by a scraper 16 and drops to the fifth two-level gas-sealing outputting device 1216 (which is a plastic and paper outputting device), and then drops to the transporter 17 for being outputted. Most medium materials drop to the winnowing vibrating screen 126 at a center of the first winnowing room 1212 right to the first two-level gas-sealing outputting device 125. Large kitchen refuse blocks with a small density and small inorganic blocks (such as glass blocks and ceramics blocks) with a large density drop to a front end of the winnowing vibrating screen 126. The small inorganic blocks are screened out by the winnowing vibrating screen 126 and drop to the two-level gas-sealing outputting device 123 (which is the small inorganic block outputting device), and then transported by the small inorganic block transporter 122. In practice, Purity of the kitchen refuse obtained by screening is not high, and partly-winded plastics and hard plastics with a large density are mixed therein. Materials such as the partly-winded plastics and the hard plastics are separated by a rear end of the winnowing vibrating screen 126 and enter the second winnowing room 1218. The second winnowing room inlet 1221 is placed under the outlet of the winnowing vibrating screen 126, a wind speed thereof is lower than a wind speed of the first winnowing room 1212. The kitchen refuse drops to a third two-level gas-sealing outputting device 1222 near the outlet and then drops to the kitchen refuse transporter 1223 for being outputted. The impurities comprise the plastics and the paper drop to a fourth two-level gas-sealing outputting device 1219 (which is a plastic and paper outputting device), then drops to a transporter 1220 for being outputted and being mixed with the plastics and paper from the first winnowing room 1212, the enter a next room for being separated. The first winnowing room 1212 and the second winnowing room 1218 communicate with the cyclone dust wiper 1213 through an outlet of a pipe 1215, wherein the dust with a small density and a small particle size is separated out, and transported to a corresponding brick-making room by a transporter or buried. Exhaust flow enters the blower set 121 through the dust wiper for forming recirculation wind. The whole system is in a sealed state. There is no secondary pollution and no exhaust treatment is needed.

What is claimed is:

1. A method for sorting and comprehensively utilizing municipal solid waste, comprising steps of:
  1) feeding the municipal solid waste into a feeding tank through a feeding inlet, then outputting the municipal solid waste into a breaking device through a feeding outlet of the feeding tank;
  2) breaking refuse bags and large blocks by the breaking device;
  3) transporting broken refuse into a two-stage roller screen for screening, wherein dusts with a particle size of less than 3 mm are screened out, and strips are hung, the strips are fibers and strip-like plastics; then transporting the dusts into a settling pond; and separating the fibers from the plastics by heavy winnowing, wherein the fibers are for producing refuse derived fuel, and the plastics are for producing wood-plastic composite; and
  4) transporting mixed refuse, formed by screening out the dusts and the strips by the two-stage screen, into a vibrating screen, wherein a hole diameter of a screen net of the vibrating screen is 10 mm, oversize products are large plastics and inorganic blocks with a particle size of over 10 mm; screening the oversize products by a heavy winnowing machine for separating the inorganic blocks, the large plastics and paper; transporting the inorganic blocks into a crushing device, then screening with the two-stage roller screen after crushing the inorganic blocks into a size of less than 3 mm; transporting underflow products with a particle size of no more than 10 mm into a two-room multi-functional winnowing machine for winnowing, and dividing the underflow products into heavy materials, light materials and medium materials by the two-room multi-functional winnowing machine; outputting the heavy materials, comprising metals, masonry, ceramics and glass, from the two-room multi-functional winnowing machine and separating magnetic materials by a magnetic separation device for recycling, and burying the masonry, the ceramics and the glass; mixing the light materials, comprising paper and plastics, with the large plastics and the paper screened out by the heavy winnowing machine, and separating the plastics and the paper by a vertical heavy winnowing machine, wherein the plastics are for producing the wood-plastic composite after cleaning, and the paper is for producing the refuse derived fuel; the medium materials comprises kitchen refuse for producing fertilizer;

wherein producing the wood-plastic composite with the plastics comprises steps of:
  I) drying wood fiber powder, crushed to 4~80 meshes by a drying device, with a temperature of 150° C. for 3 h;
  II) mixing the plastics obtained by heavy winnowing with the plastics obtained by the vertical heavy winnowing machine, cleaning and crushing, drying and dehydrating before granulating for obtaining mixed plastic grains with a size of 40~60 meshes; and
  III) firstly adding the wood fiber powder into a high-speed mixer of a heating device and stirring for 5 min, then adding the mixed plastic grains and additive agents except compatibilizer and stirring, adding the compatibilizer 5 min before outputting, and thoroughly stirring before outputting for obtaining the wood-plastic composite;

wherein components and contents of the wood-plastic composite are: polyethylene 30%~47%, polypropylene 5%~8%, polyvinyl chloride 10%~15%, the wood fiber powder 30%~35%, the compatibilizer 3%~8%, coupling agent 0.3%~2.4%, light stabilizer 0.3%~0.5%, antioxidant 0.3%~0.5%, lubricant 2%~4%, coloring agent 1%~3%, antistatic agent 0.2%~0.4%, and deodorizing bactericidal preservatives 0.2%~0.3%; the wood fiber powder is selected from a group consisting of poplar, peach, locust and cedar wood fiber powder; the compatibilizer is HD900E ester compatibilizer; the coupling agent is titanate JTW-130 coupling agent; the light stabilizer is bis(2,2,6,6-tetramethyl-4-piperidyl)

sebacate; the antioxidant is 3-methyl-4-isopropyl-phenol; the lubricant is polyethylene wax; the coloring agent is quinacridone coloring agent; the antistatic agent is octadecyl dimethyl hydroxyethyl quaternary ammonium nitrate; and the deodorizing bactericidal preservatives is SW100 deodorant of YITERTM.

2. The method, as recited in claim 1, wherein producing the fertilizer with the kitchen refuse comprises steps of: directly mixing the medium materials obtained by the two-room multi-functional winnowing machine with a material selected from a group consisting of chicken manure, pig manure, straw and rice husks, then transporting to an aerobic fermentation device to aerobically ferment for 10~15 days, fermenting for 30 days in a static windrow accumulation form, then separating out plastics and inorganic impurities with a particle size of more than 4~5 mm; then transporting to a fertilizer base tank, weighting, adding ammonia water and vapor, and transporting to a granulating device for granulating; after granulating, transporting to a drier for being dried, then placing on a dry leather belt for being further dried; then finely screening, and transporting underflow products with a particle size of less than 1 mm back to the fertilizer base tank; then coarsely screening, and transporting oversize products with a particle size of more than 5 mm back to the fertilizer base tank; then transporting to a cooler for being cooled before entering a final screen, and transporting underflow products with a particle size of less than 1 mm back to the fertilizer base tank; and packaging fertilizer end products.

3. The method, as recited in claim 1, wherein producing the wood-plastic composite with the plastics further comprises steps of:
   IV) granulating wood-plastic grain materials obtained by the high-speed mixer for obtaining wood-plastic grains; and
   V) squeezing and molding the wood-plastic grains by a screw extruder, and obtaining end products; wherein during squeezing and molding, a feeding section temperature is 140° C., and a squeezing section temperature is 210° C.

4. The method, as recited in claim 1, wherein producing the refuse derived fuel with the paper and the fibers comprises steps of:
   a) mixing the paper with the fibers for forming a domestic refuse combustible component, then drying with a rotary drier with a drying temperature of 200° C. for reducing a moisture content to 25%;
   b) crushing the domestic refuse combustible component with a cutting crusher, in such a manner that 95% of crushed grains have a size of less than 20 mm;
   c) crushing bituminous coal into a particle size of 3~5 mm, then mixing with the domestic refuse combustible component and calcium oxide, thoroughly stirring and storing for 10 min;
   d) adding a mixture of industrial corn starch and sodium humate;
   e) squeezing and molding by a screw extrusion molding machine during a molding process; and
   f) drying the refuse derived fuel obtained by squeezing and molding with a drying temperature of 150° C. for reducing a moisture content thereof to 12%;
   wherein components and contents of the refuse derived fuel are: the domestic refuse combustible component 65.0%~74.0%, the bituminous coal 21.5%~30%, the calcium oxide 1.0%~2.5%, the industrial corn starch 1.5%~2.5%, and the sodium humate 1.0%.

5. The method, as recited in claim 1, wherein the step 3) further comprises steps of: after transporting the dusts into the settling pond, separating organic substances and inorganic substances by settling, preparing methane with the organic substances, and burying the inorganic substances.

6. The method, as recited in claim 1, wherein the two-stage roller screen comprises a supporter, a roller screen and a roller screen driver (4) both mounted on the supporter; wherein the roller screen comprises a roller screen inlet section (1) and a roller screen outlet section (5) connected to each other; an inlet (2) is mounted at an entrance of the roller screen inlet section (1), and an underflow product collector (7) is provided under the roller screen; the roller screen inlet section (1) and the roller screen outlet section (5) respectively have a plurality of screening holes (101), a plurality of bag-breaking knives (102) are mounted on a circumference internal surface of the roller screen inlet section (1), and a knife cleaner (103) corresponding to the bag-breaking knives (102) is provided in the roller screen inlet section (1); a hole cleaner (6) is mounted on circumference external surfaces of the roller screen inlet section (1) and the roller screen outlet section (5) for cleaning the screening holes (101); a plurality of strip hangers are mounted on a circumference internal surface of the roller screen outlet section (5), a strip collector, comprising three rows of hook needle chains (502, 503 and 504), is mounted in the roller screen outlet section (5).

7. The method, as recited in claim 1, wherein the two-room multi-functional winnowing machine comprises: a shell, a first winnowing room provided in the shell, a second winnowing room provided in the shell, and a winnowing vibrating screen provided in the shell; wherein a rotary feeder is mounted at an inlet of the shell; a first winnowing room inlet communicating with a blower set is provided under the rotary feeder; a first two-level gas-sealing outputting device is provided under the first winnowing room and near the first winnowing room inlet; the winnowing vibrating screen is provided on right of the first two-level gas-sealing outputting device; a second two-level gas-sealing outputting device is provided under the winnowing vibrating screen; the second winnowing room is provided on right of the winnowing vibrating screen; a second winnowing room inlet communicating with the blower set is provided under an outlet of the winnowing vibrating screen, a third two-level gas-sealing outputting device is provided under the second winnowing room and near the second winnowing room inlet, and a fourth two-level gas-sealing outputting device is provided under the second winnowing room and away from the second winnowing room inlet; a second comb plate is provided on the fourth two-level gas-sealing outputting device behind the second winnowing room; a first comb plate and a fifth two-level gas-sealing outputting device are provided behind the first winnowing room and away from the first winnowing room inlet; outlets of the first and second winnowing rooms are connected to a cyclone separator through pipes; and the cyclone separator is connected to the blower set through pipes.

* * * * *